Patented Mar. 21, 1950

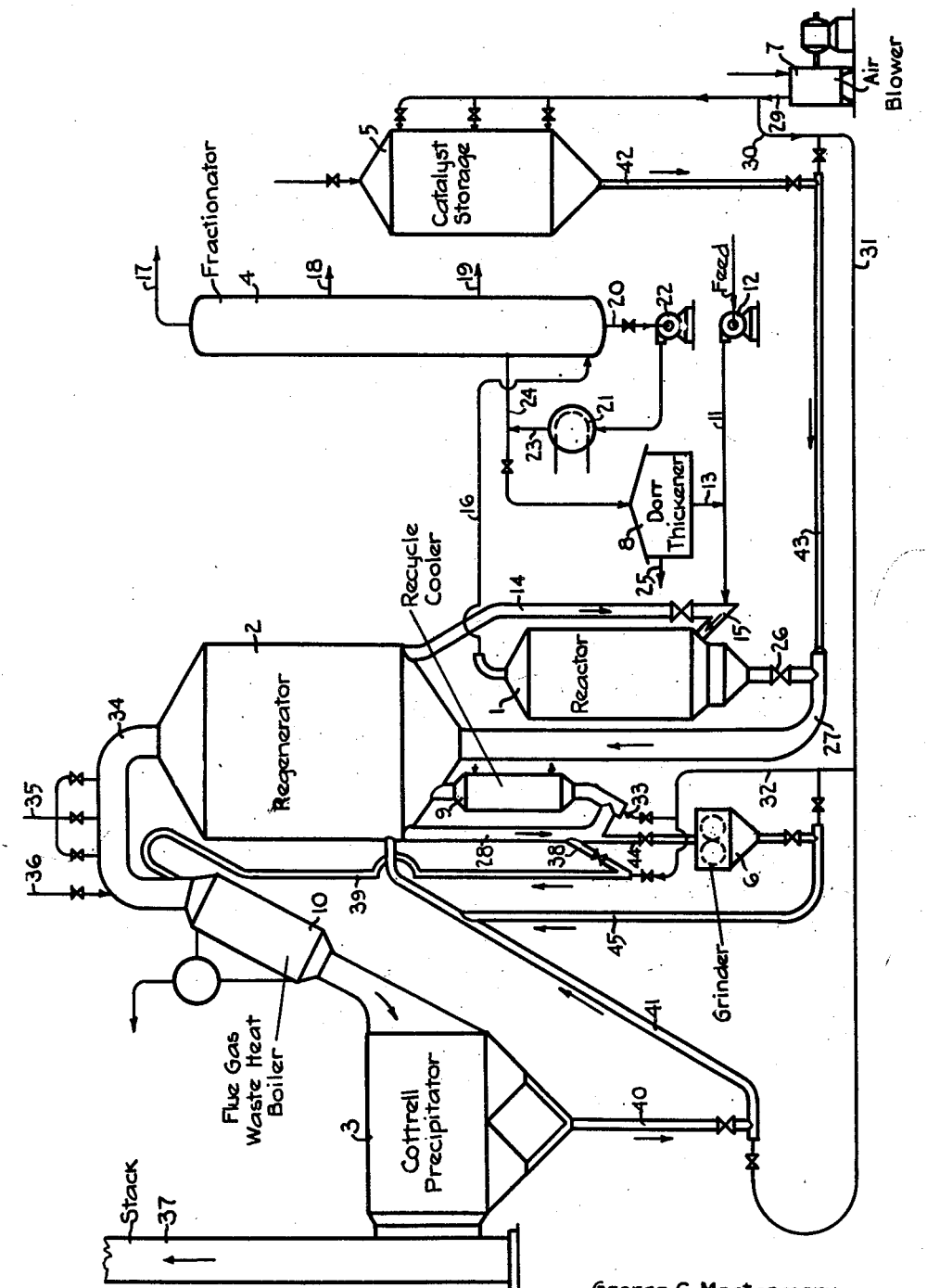

2,501,436

UNITED STATES PATENT OFFICE 2,501,436

PROCESS FOR EFFECTING CATALYTIC CONVERSIONS WITH FINELY DIVIDED CATALYSTS

Donald L. Cleveland and John A. Hatton, Long Beach, and George C. Montgomery, Wilmington, Calif., assignors to Shell Development Company, San Francisco, Calif., a corporation of Delaware Application June 11, 1945, Serial No. 598,704

2 Claims. (Cl. 23—1)

This invention relates to an improvement in the application of finely divided or powdered catalysts. More particularly, the invention relates to an improved method for effecting catalytic conversions with finely divided catalysts which is restricted to application in catalytic systems having the following characteristics: (1) The catalyst is used in the form of a finely divided solid consisting of particles of various sizes. (2) The activity or effectiveness of the catalyst is maintained at a desired level by continuously or intermittently replacing a portion of the catalyst by fresh or more active catalyst. (3) the catalyst at some step in the process is contacted with a stream of a gas or vapor which leaves the system and which tends to carry in suspension with it a portion of the catalyst. (4) Said gas or vapor stream is passed through an electrical separator to separate and recover suspended catalyst therefrom. (5) The catalyst separated and recovered by said electrical separator is returned to the main mass of catalyst.

In view of several disadvantages inherent in fixed bed catalyst systems, various processes have been proposed for effecting catalytic conversions while cycling the catalyst in a finely divided or powdered form through the reaction zone and, in many cases, a separate regeneration zone. In processes of this type an appreciable amount of grinding or degradation of the catalyst particles takes place due to erosion and attrition. Consequently, the particles of the equilibrium catalyst range in size from the smallest size capable of being recovered and retained in the system by the recovery equipment up to the largest particles in the fresh catalyst added. The amount of catalyst of any given size within this range depends upon the size range of the fresh catalyst added and the efficiency of the various pieces of recovery equipment under the conditions of use.

In such systems where a finely divided catalyst is contacted with a gas or vapor stream which may be a reactant or simply a medium of transport, a portion of the finely divided catalyst tends to be carried out of the system in suspension in the gas or vapor stream. In order to avoid excessive losses of the catalyst, the suspended catalyst is separated from the gas stream and returned to the main body of the catalyst. The separation may be partly accomplished by means of cyclone separator. However, such separations are relatively inefficient in recovering the small catalyst particles and, consequently, it is the practice to supplement such separation by a more efficient separation means. The preferred separation means generally used is an electrical separator such as the well known Cottrell precipitator. Such separators are quite efficient and are furthermore relatively non-selective as to particle size, i. e. very small catalyst particles are separated substantially as efficiently as larger catalyst particles.

In the usual design and operation of such systems a portion of the very fine catalyst particles largely produced by attrition are lost with the exit gas or vapor through the Cottrell precipitators. In a typical case (catalytic cracking in a 15,000 barrel per day fluid catalyst catalytic cracking plant) this loss amounts to from about 0.5 to about 2 tons per day. This loss is roughly proportional to the amount of catalyst fines (i. e. 0–20 micron catalyst particles) in the system. Analysis and inspection of the catalyst fines collected by the Cottrell precipitators in such operation shows that this material is at least as active as, if not somewhat more active than, the main portion of the catalyst in the system. Consequently, every effort has been and still is made to maintain the loss of such fine catalyst through the Cottrell precipitators at a minimum. For this reason, it is considered desirable to maintain the concentration of catalyst fines relatively low (for example, 15%–25% by weight). This, in turn, is accomplished by feeding a fresh catalyst which contains only about 10% of 0–20 micron particles, by adjusting the gas velocities, etc., within the system to afford a low rate of catalyst attrition, by utilizing catalyst which attrides at a slow rate, etc.

One of the primary advantages of processes of the described type is that they may be carried out substantially continuously. In such an operation it is necessary, in order to maintain the effectiveness of the catalyst at a desired level, to continuously or intermittently replace a portion of the catalyst with fresh catalyst. At a given replacement rate the activity of the catalyst comes to a steady or equilibrium state. The activity of the catalyst at this steady or equilibrium state is called the equilibrium activity and is a function of the replacement rate. Thus, the equilibrium activity of the catalyst refers to the steady activity level established in the catalyst system under steady operation by any given rate of replacement of the catalyst with fresh or more active catalyst.

The primary object of the process of the present invention is to provide a process whereby a higher or enhanced equilibrium activity of the catalyst may be maintained at any given catalyst replacement rate. It has now been found that by subjecting the catalyst in the system to a grinding treatment the equilibrium activity of the catalyst in the system may be increased. Thus, according to the process of the present invention, the equilibrium activity of the catalyst in systems of the type described is maintained at an enhanced level by continuously or intermittently withdrawing a representative portion of the catalyst, subjecting the withdrawn portion to a grinding treatment, and then recombining the portion with the main catalyst mass. By a representative portion is meant a portion of the catalyst which has substantially the same size distribution as the total catalyst in the system. This operation, it will be noted, is contrary to the present trends and beliefs in the art since it results in increasing the proportion of catalyst fines in the system. The process is effective when operating continuously. However, it is somewhat more effective when the grinding treatment is applied at intervals. In order to counterbalance the effect of the grinding treatment in producing a greater proportion of catalyst fines, it is advantageous to use a relatively coarse catalyst for make-up, i. e. for the usual catalyst replacement.

The process of the invention is applicable and advantageous in various catalytic conversions when carried out in systems of the type described. Thus, it may be applied in such systems regardless of the particular conversion or treatment being carried out. The gas or vapor stream may be a reactant vapor or a gas or vapor used for another purpose such, for example, as to transport the catalyst, or to flush or strip the catalyst of some adsorbed material, or simply as an inert diluent. Also, the catalyst may be a single material or a mixture of two or more distinct materials and may be of any composition. However, one immediate contemplated application of the invention is in the catalytic cracking of hydrocarbon vapors by the fluid catalyst catalytic cracking process. The particulars of the invention therefore will be described in connection with this process.

To assist in the description, reference is had to the accompanying drawing wherein there is illustrated by means of conventional figures, not drawn to scale, the more important elements of a fluid catalyst catalytic cracking plant adapted for operation in accordance with the process of the invention. A fluid catalyst catalytic cracking plant of the down-flow type has been chosen to illustrate the invention. (See Oil and Gas Journal, 43, 64, (1945) for further particulars regarding fluid catalyst systems.) However, it will be understood that the invention is just as applicable and advantageous in up-flow systems as well as in various other system. Referring to the drawing, the plant comprises a down-flow fluid catalyst reactor 1, a down-flow fluid catalyst regenerator 2, a Cottrell precipitator 3, a fractionator 4, a catalyst hopper 5, a grinder 6, an air blower 7, a Dorr thickener 8, a catalyst recycle cooler 9, and a waste heat boiler 10.

The catalyst used in the system may be any one of the various solid cracking catalysts known in the art and may be, for example, a Filtrol catalyst or a synthetic silica-alumina composite catalyst. The catalyst charged to the unit is ordinarily ground to pass a 100-mesh sieve. The typical size analysis of a synthetic silica-alumina composite catalyst as charged to commercial units is as follows:

| Size in microns | % Finer than size indicated |
| --- | --- |
| 25 | 28% |
| 50 | 58% |
| 75 | 78% |
| 100 | 90% |
| 125 | 98% |

However, it will be appreciated that catalysts having particles up to about 300 microns or even larger may be and have been used. During use the catalyst particles are subjected to grinding as well as to attrition and erosion, and there is consequently a displacement towards the smaller sizes.

The oil to be cracked may be any normally liquid hydrocarbon oil such, for example, as a gas oil fraction. The oil feed (usually preheated up to a temperature of, for example, 400° F.–800° F., by means not shown) enters the system via line 11 and pump 12. A slurry of catalyst and oil, produced as hereinafter described, is introduced into the oil feed via line 13. The oil feed then picks up hot freshly regenerated catalyst from the regenerator standpipe 14. The amount of catalyst introduced into the oil in this type of cracking unit is usually between about 10 and 25 parts by weight. The mixture of catalyst and oil then passes into the reactor 1 via line 15. Reactor 1, as illustrated, is a conventional down-flow type of fluid catalyst reactor. In reactor 1 the oil contacts a bed of fluidized catalyst under conditions conducive to the desired conversion of the particular oil feed. In general the conditions are about as follows:

Pressure _____ 0–10 atmospheres
Temperature _____ 700° F.–1100° F.
Liquid hourly space velocity__ 0.4–6

The hydrocarbon vapors pass through internal cyclone separators (not shown) to remove the bulk of suspended catalyst particles and then pass out of the top of the reactor via line 16 to fractionator 4.

In fractionator 4 the product is separated into the desired fractions. Thus, gasoline plus gas may be removed overhead via line 17, light gas oil or naphtha may be removed via line 18, heavy gas oil may be removed via line 19, and a heavy oil may be removed from the bottom via line 20. This heavy oil may be passed through a cooler or waste heat boiler 21 and a part of it recycled back to the fractionator via pump 22 and lines 23 and 24 to quench or desuperheat the feed. This heavy oil contains some catalyst particles which escaped separation by the cyclone separators in reactor 1; it is therefore preferably passed to a thickener 8. Relatively clean oil is withdrawn via line 25 and the thickened slurry of catalyst is withdrawn via line 13 and recycled, as described.

A portion of the catalyst in reactor 1 substantially equal to the amount of catalyst introduced via line 15 is continuously withdrawn from the bottom through valve 26 into line 27. This catalyst is picked up by a stream of regeneration air from blower 7 and carried up into regenerator 2. Regenerator 2, as illustrated, is a conventional down-flow fluid catalyst regenerator. The air stream passes up through the fluidized bed of catalyst in regenerator 2 burning combustible deposits from the catalyst.

A portion of the hot regenerated catalyst is continuously withdrawn from the regenerator via standpipe 14 and introduced into the reactor, as described.

In order to avoid overheating in the regeneration, it is usually necessary to cool the catalyst and this is done by recycling a portion of the catalyst through recycle catalyst cooler 9. Thus catalyst is withdrawn via standpipe 28. This catalyst is picked up by a stream of air and passed through recycle catalyst cooler 9 back up into the regenerator. The air stream is produced by blower 7 and flows via lines 29, 30, 31, 32 and 33.

The hot regeneration gases, after passing up through the catalyst bed, pass through internal cyclone separators (not shown) to remove the bulk of the suspended catalyst particles and then pass out of the regenerator via line 34 to Cottrell precipitator 3. In order to allow the Cottrell precipitator to operate efficiently, it is necessary to condition this gas. Thus, the water vapor content of the gas is increased by the injection of water spray via line 35. Also, a material such as ammonia gas, which increases the efficiency of separation is injected via line 36. Also, the gas is cooled by passing it through a waste heat boiler 10.

In order to increase the heat transfer in the waste heat boiler 10, and also to improve the handling qualities of the catalyst fines collected by the Cottrell precipitator 3, it is desirable to add to the gas stream a small amount of catalyst flux, i. e. catalyst of the regular degree of fineness. Thus, a portion of the catalyst mass may be withdrawn via branch line 38 of standpipe 28 and carried by means of air through line 39 to the inlet end of the waste heat boiler 10.

The conditioned gas passes through the Cottrell precipitator 3 and then out of the system through the stack 37. This gas carries in suspension a small amount of catalyst particles which escaped separation by the cyclone separators in the regenerator. The major part of this suspended catalyst is precipitated by the Cottrell precipitator. However, a minor part passes with the gases out through the stack and is lost. The catalyst collected by the Cottrell precipitator 3 is withdrawn via standpipe 40 and is carried by a stream of air via line 41 back to the regenerator where it mixes with the main mass of the catalyst. Thus, for example, in a typical fluid catalyst catalytic cracking plant having a catalyst inventory in the order of 700 tons, about 240,000 pounds of air per hour is used for the regeneration. A typical analysis of the spent regeneration gas (excluding water vapor) is:

| | Mol percent |
|---|---|
| $CO_2$ | 10 |
| $CO$ | 7 |
| $O_2$ | 4 |
| $N_2$ | 79 |

This gas leaves the regenerator at a temperature in the order of 950° F.–1150° F. Sufficient water is introduced bringing the total water content up to about 20 mol per cent and about 10–30 lbs./hr. of ammonia is added. The gas is cooled to a temperature in the order of 500° F. The total amount of catalyst collected by the Cottrell precipitator is in the order of 25–60 tons per day and the loss of catalyst through the stack is in the order of 1–5 tons per day. A typical size analysis of the material separated by the Cottrell precipitator (when no catalyst flux is added) is as follows:

| Particle size range in microns | Percent by weight |
|---|---|
| 0–20 | 88 |
| 20–40 | 11.1 |
| 40–60 | 0.6 |
| 60–80 | 0.4 |

In order to maintain the catalyst inventory, an amount of fresh catalyst substantially equivalent to the amount of catalyst lost is continuously or intermittently supplied to the system from catalyst storage hopper 5. This catalyst, for instance, 3 tons per day, is introduced by the air stream via lines 42 and 43. The equilibrium activity of the catalyst in the system is determined, other things being equal, by the amount of the fresh catalyst added, i. e. by the replacement rate.

An important and characterizing feature of the process of the present invention is that in systems of the general type specifically illustrated and described above wherein finely divided catalyst is separated and recovered from an exit gas stream by means of an electrical precipitator and recycled, and catalyst is added to make up for loss through the electrical precipitator, the catalyst in the system is subjected to a grinding treatment. Thus, a portion of the catalyst is withdrawn, ground, and recombined with the main portion of the catalyst. The portion of the catalyst withdrawn and ground should be fairly representative of the catalyst in the system and not a selected fraction of restricted particle size range. In the fluid catalyst catalytic cracking plant used for illustrating the invention, this is accomplished by withdrawing a representative portion of the catalyst from the regenerator via standpipe 28, and branch line 44 to grinder 6. The material may be ground while hot, or, if desired, a cooler (not shown) may be inserted in line 44. Grinder 6 may be of any of the conventional types adapted for further grinding of powders, such, for instance, as ball mill, rod mill, roller mill, hammer mill, or a pulverizer. A ball mill and a Raymond mill, for example, have been used and are quite satisfactory. This grinding operation may be carried out continuously during the operation of the plant. The amount of catalyst ground may vary over wide limits which will depend largely upon the amount of grinding exerted upon the material. In general, a deep grinding is less preferred than a rather light or superficial grinding treatment. For instance, passage of the material through the grinder at such a rate that the amount of materials in the range of 0–20 microns is increased by about 3% (for instance, from 25% to 28%) is sufficient. More severe grinding may, of course, be applied, but the degree of grinding and the amount of material treated should not be correlated to cause the percentage of catalyst fines (0–20 micron material) to become inordinately large. Thus, for example, it is preferred to hold the percentage of fines in the main mass of catalyst below about 50% by weight. When grinding continuously, for example, excellent results may be obtained by grinding between about 0.5% and 10% of the catalyst inventory per day. Under these conditions of grinding, the loss of catalyst fines with the gases leaving the Cottrell precipitator is increased somewhat.

Another method of operation which is somewhat preferred is to withdraw and grind a portion of the catalyst at periodic intervals, for instance, operate the grinder one day a week, or one week a month, or one month semi-annually.

The ground catalyst (i. e. the catalyst passed through the grinder 6) is then recombined with the remaining portion of the catalyst. This catalyst may be introduced into any portion of the plant such as the feed line, the reactor, the regenerator, or the inlet to the Cottrell precipitator. In the plant illustrated, the ground catalyst is returned to the regenerator via lines 45 and 41.

In order to counteract to a certain extent the increase in the concentration of catalyst fines due to the grinding treatment, it is desirable to charge a relatively coarse catalyst for replacement. For instance, a synthetic catalyst ground simply to pass a 40-mesh standard sieve may be used for replacement rather than the usual catalyst which is ground to pass a standard 100-mesh sieve. The former is rich in relatively large particles and poor in fines, but is difficult to fluidize and recycle if used alone without the described grinding operation.

It should be noted that in the above-described process of the invention no catalyst is withdrawn for replacement beyond that lost through the electrical precipitator, and the amount of catalyst lost through the electrical precipitator is increased above the normal to provide for the desired replacement rate by increasing the concentration of catalyst fines in the catalyst by the continuous or intermittent grinding of a representative portion of the catalyst. This process, which is based upon certain rather complicated considerations, has been applied on a commercial scale and has proven to afford the advantages claimed.

We claim as our invention:

1. In a catalytic conversion system in which a powdered catalyst consisting of finely divided particles of different sizes less than about 300 microns in diameter is recycled through a conversion zone, and in which suspended catalyst ranging essentially from a fraction of a micron diameter up to about 20 microns diameter is separated and recovered for reuse from a gas or vapor stream leaving the system by means of an electrical precipitator, and in which the decline in the activity of the catalyst in the system with use is counteracted by continually replenishing the catalyst with more active catalyst, the improvement which comprises withdrawing a portion of said powdered catalyst consisting of finely divided particles less than about 300 microns in diameter and having substantially the same particle size distribution as the said catalyst in the system, grinding said withdrawn portion of the catalyst to increase the proportion of particles ranging essentially from a fraction of a micron diameter up to about 20 microns diameter therein, and recombining the total portion of catalyst so treated, including the material ranging essentially from a fraction of a micron diameter up to about 20 microns diameter, with the remainder of the catalyst in the system.

2. The process according to claim 1 further characterized in that the more active catalyst used to replenish the catalyst in the system has a larger average particle size than the catalyst in the system.

DONALD L. CLEVELAND.
JOHN A. HATTON.
GEORGE C. MONTGOMERY.

REFERENCES CITED

The following references are of record in the file of this patent:

UNITED STATES PATENTS

| Number | Name | Date |
|---|---|---|
| 2,327,175 | Conn | Aug. 17, 1943 |
| 2,355,016 | Stein, Jr. | Aug. 1, 1944 |
| 2,379,448 | Linn | July 3, 1945 |